(12) United States Patent
Gonzalez

(10) Patent No.: US 9,221,505 B1
(45) Date of Patent: Dec. 29, 2015

(54) ENDLESS TRACK ADAPTER

(71) Applicant: Guillermo G. Gonzalez, Hialeah Gardens, FL (US)

(72) Inventor: Guillermo G. Gonzalez, Hialeah Gardens, FL (US)

(*) Notice: Subject to any disclaimer, the term of this patent is extended or adjusted under 35 U.S.C. 154(b) by 134 days.

(21) Appl. No.: 14/156,902

(22) Filed: Jan. 16, 2014

(51) Int. Cl.
  *B62D 55/21* (2006.01)
  *B62D 55/20* (2006.01)
  *B62D 55/30* (2006.01)
  *B62D 55/32* (2006.01)

(52) U.S. Cl.
  CPC .............. *B62D 55/202* (2013.01); *B62D 55/21* (2013.01); *B62D 55/305* (2013.01); *B62D 55/32* (2013.01)

(58) Field of Classification Search
  CPC ........ B62D 55/08; B62D 55/18; B62D 55/20; B62D 55/202; B62D 55/205; B62D 55/21; B62D 55/30; B62D 55/305; B62D 55/32; B62D 22/202
  USPC ............ 305/116, 185, 41, 45, 193, 202, 204; 152/170, 185, 182, 183; 280/DIG. 10
  See application file for complete search history.

(56) References Cited

U.S. PATENT DOCUMENTS

| | | | |
|---|---|---|---|
| 4,099,794 A * | 7/1978 | Hoffart ................ | B62D 55/20 305/113 |
| 4,960,180 A | 10/1990 | Livingston | |
| 5,577,567 A * | 11/1996 | Johnson ................ | A61G 5/061 180/9.23 |
| 6,076,619 A | 6/2000 | Hammer | |
| 6,637,840 B2 * | 10/2003 | Zaleski ................ | B62D 55/24 152/187 |
| 7,901,015 B1 * | 3/2011 | Anderson ............. | B62D 55/28 152/225 C |

* cited by examiner

*Primary Examiner* — John Walters
(74) *Attorney, Agent, or Firm* — Crossley Patent Law

(57) ABSTRACT

An endless track adapter system for a wheeled vehicle includes a plurality of adjustable track links selectively interconnectable by a plurality of pins into an endless track for driving by wheels of the vehicle. Track links include track link base portions including medial wheel guides and track link sled portions including lateral wheel guides. A mechanism is provided for adjusting distance between the medial and lateral wheel guides.

18 Claims, 5 Drawing Sheets

ENDLESS TRACK ADAPTER

BACKGROUND

While wheelchairs and other similar personal mobility devices have made it possible for disabled persons to get around more easily, these devices have their limitations. Persons disabled and dependent upon these devices are often prevented from venturing onto loose, uneven or otherwise difficult terrain. This restriction makes enjoyment of a variety of activities including certain outdoor activities impossible.

SUMMARY

An endless track adapter system for a wheeled vehicle includes a number of link base portions each having an upper surface, front and rear edges and a medial wheel guide and a number of link sled portions each having an upper surface, front and rear edges, a lateral wheel guide and a lower surface adapted to slidably engage upper surfaces of the link base portions. Sliding engagement of link sled portions with link base portions is constrained by a ridge and a slot.

In a method for converting a wheeled vehicle to a tracked vehicle, a first plurality of link base portions are each provided with an upper surface, front and rear edges and a medial wheel guide and a first plurality of link sled portions are each provided with an upper surface, front and rear edges, a lateral wheel guide and a lower surface. The lower surface of the first plurality of link sled portions are engaged with the upper surface of the first plurality of link base portions and the first plurality of link base portions are interconnected by hinges to form an endless track of link base portions configured to be driven by wheels of the wheeled vehicle.

DETAILED DESCRIPTION

Figure 1:
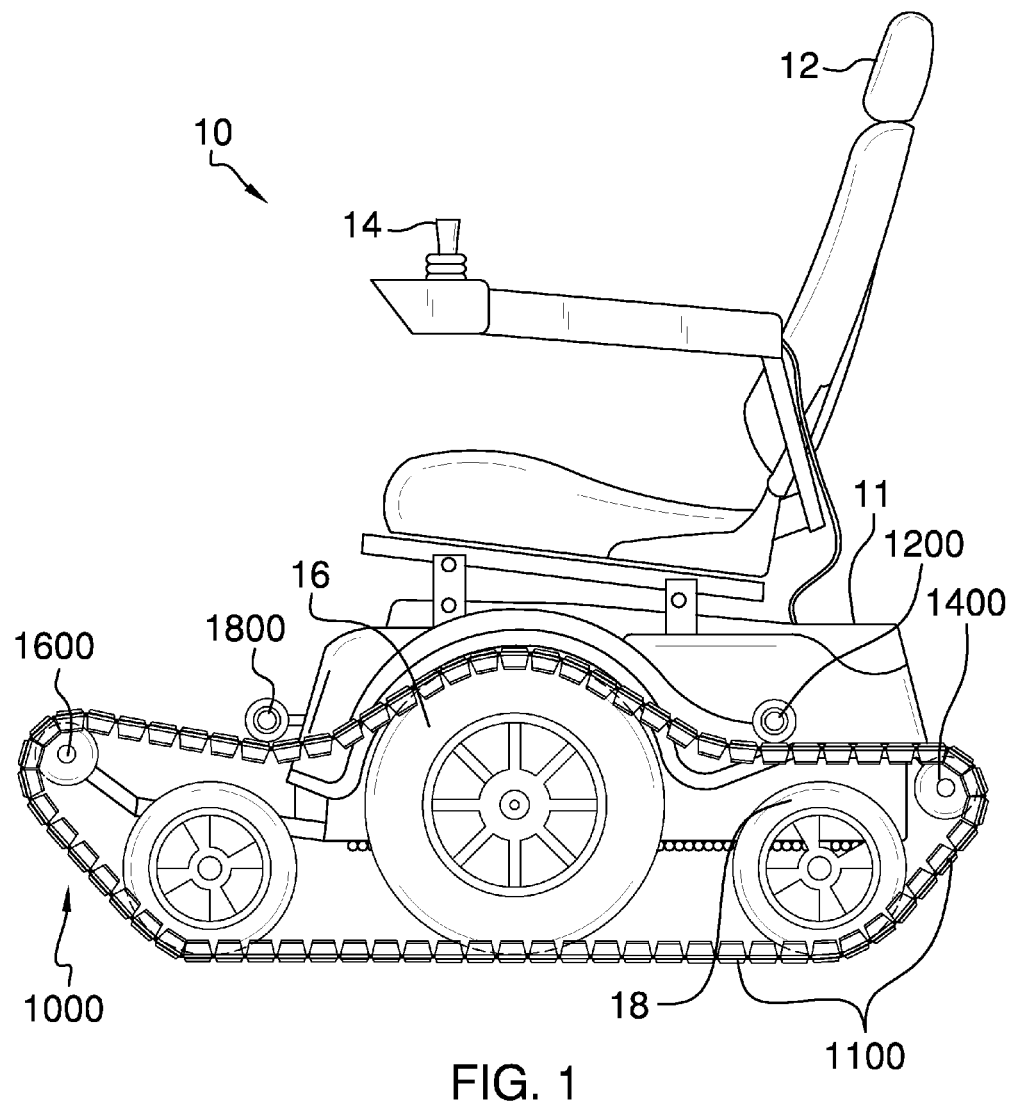
FIG. 1 illustrates a side view of an example adapter system fitted to a wheelchair.
Figure 2:
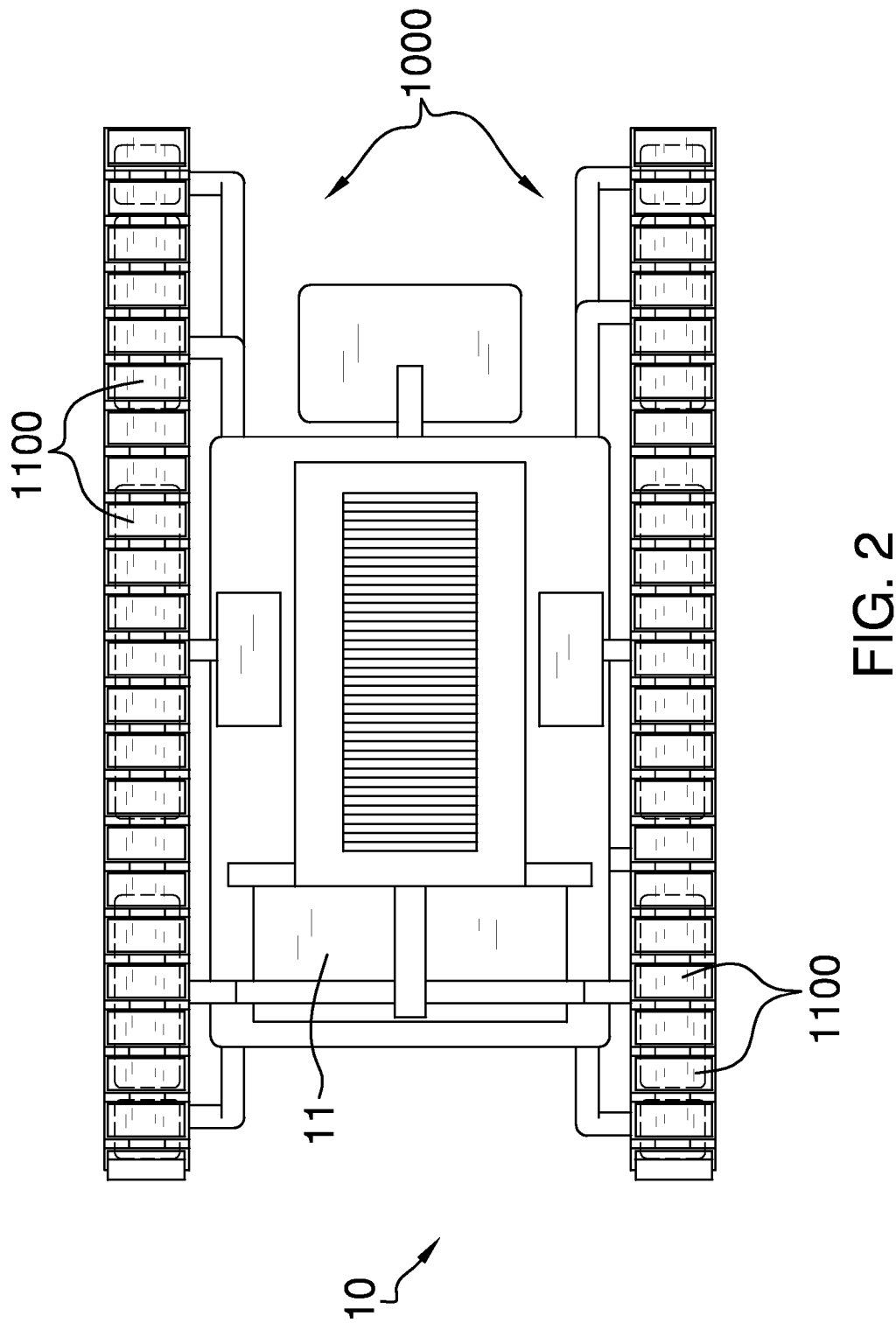
FIG. 2 illustrates a bottom view of the example adapter system of FIG. 1.

With reference now to the Figures, a new endless track adapter for use with wheeled vehicles and generally designated by the reference numeral 1000 will now be described.

Figure 6:
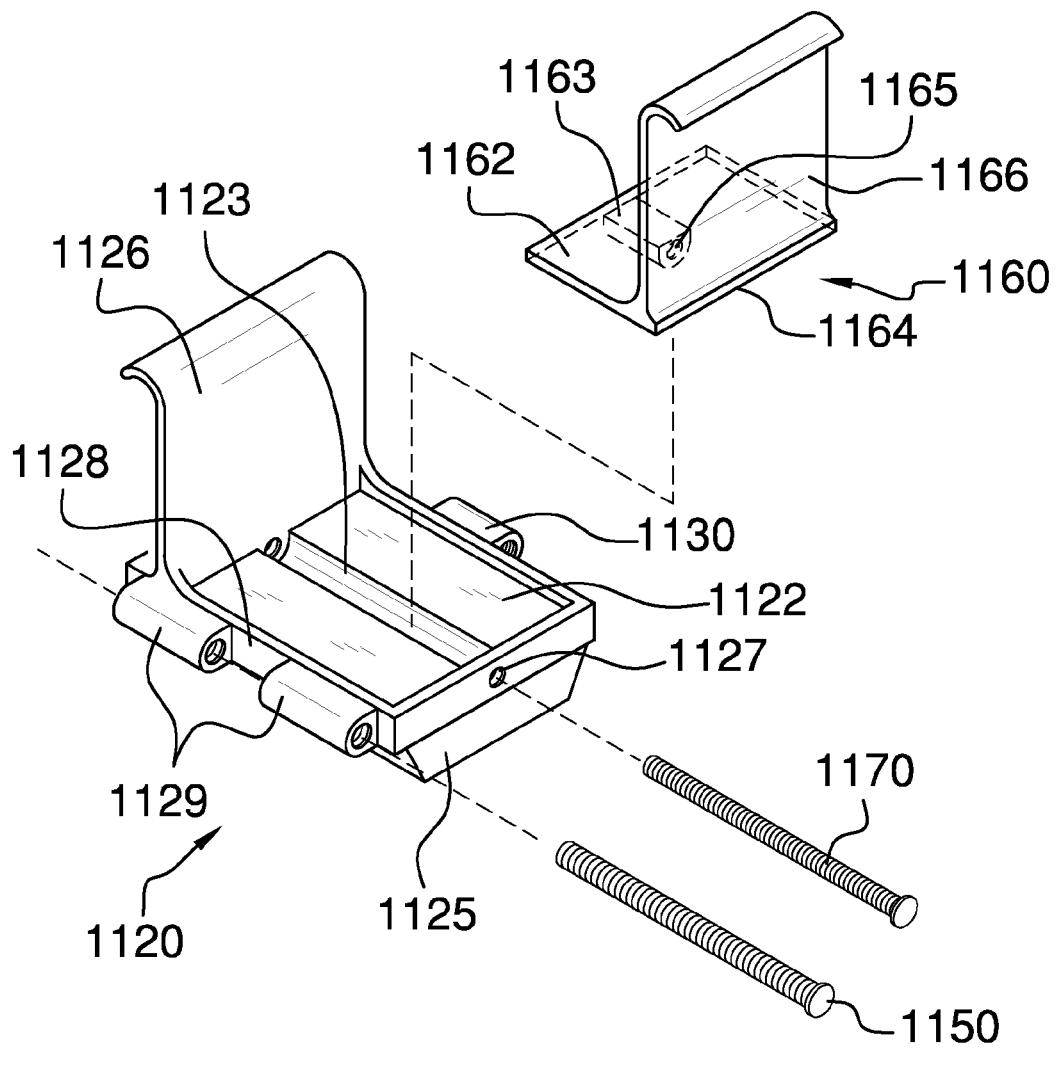
FIG. 6 illustrates an exploded view of the track link of FIG. 4 demonstrating distinct track link base and track link sled components.

Adapter or adapter system 1000 is configured to convert a wheeled vehicle to an endless track vehicle. Each of a plurality of adjustable selectively interconnectable track links 1100 includes a base portion 1120 and a sled portion 1160. Base portions 1120 include an upper surface 1122 and a slot 1123. Sled portions 1160 include lower surface 1164 for sliding engagement with upper surfaces 1122 of base portions 1120. With reference to FIG. 6, upper surfaces 1122 may be provided in a recessed arrangement such that sliding of the link sled portions 1160 upon the link base portions 1120 is governed or limited at the edges of upper surfaces 1122.

Medial guides 1126 extend upward from base portions 1120 and, in use, are positioned generally adjacent to the vehicle center or interior portion. Lateral guides 1166 extend upward from the sled portions 1160 and, in use, are positioned generally remote from the vehicle center or interior portion. In cooperation, medial guides 1126 and lateral guides 1166 are configured to contain wheels 16 and 18 of the wheeled vehicle 10 towards the vehicle center and away from the vehicle center, respectively.

With link sled portions 1160 slidably engaged with link base portions 1120, a ridge 1163 formed on sled lower surface 1164 is configured for sliding receipt within a slot 1123 provided in base upper surface 1122. A longitudinal axis of the ridge 1163 is oriented generally from medial guide 1126 towards lateral guide 1166 or from lateral guide 1166 toward medial guide 1126 when the base portions 1120 and the sled portions 1160 are lapped together. Similarly, a longitudinal axis of the slot 1123 is oriented generally between the medial guides 1126 and lateral guides 1166 when the base portions 1120 and the sled portions 1160 are lapped together. By cooperation of ridge 1163 with slot 1123, sliding of lower surface 1164 with respect to upper surface 1122 is limited or constrained to a single axis so that medial guides 1126 and lateral guides 1128 may be moved towards one another but are prohibited from relative rotation and relative sliding along axes which would intersect with the longitudinal axes of the ridges 1163 and slots 1123.

Sliding movement of one of the plurality of link sled portions 1160 relative to one of the plurality of link base portions 1120 in a first direction causes spacing between the medial wheel guides 1126 and the lateral wheel guides 1166 to increase and sliding movement of one of the plurality of link sled portions 1160 relative to one of the plurality of link base portions 1120 in a second, opposite direction causes spacing between the medial wheel guides 1126 and the lateral wheel guides 1166 to decrease. Relative movement of the link base portions 1120 and the link sled portions 1160 enables adjusting track links 1100 to fit a variety of wheel widths.

Ridge 1163 further comprises a bore 1165 oriented generally along the longitudinal axis of the ridge 1163 which is configured to receive a threaded fastener or other means or mechanism 1170 for adjusting the relative positions of medial guides 1126 and lateral guides 1166.

Bore 1127 is generally aligned with the longitudinal axis of the slot 1123 and is provided for accommodating an adjusting mechanism such as fastener 1170. When engaged, medial guides 1126 and lateral guides 1166 move towards one another when threaded fastener 1170 or other mechanism for adjusting is rotated in a first direction and move away from one another when the threaded fastener 1170 is rotated in a second direction opposite the first direction.

Base portions 1120 include first barrels, knuckles, curls, loops or nodes 1129 at a front edge 1128 which are configured to surround second barrels, knuckles, curls, loops or nodes 1131 provided at a rear edge 1130 of an adjacent base portion. Thus, with adjacent track links 1100 interconnected, barrels 1131 fit between two or more of the barrels 1129. A plurality of pins 1150 inserted through aligned barrels 1129 and 1131 hingedly couple two or more track links 1100 at respective base portions 1120.

A pad 1125 is coupled to each base portion 1120 at a lower surface 1124 and configured to engage a ground surface when the vehicle is being operated in a converted state. Pads 1125 may be comprised of a resilient, durable material which will substantially avoid damaging soft surfaces while resisting degradation due to wear. Rubber is one example material of construction for pads 1125. It should be understood however, that suitable materials are not limited to this.

Tensioning wheels 1400 are configured to be coupled with a wheeled vehicle so as to project from the rear portion thereof and tensioning wheels 1600 are configured to be coupled with the wheeled vehicle so as to project from a front portion thereof. With links 1100 installed or applied to wheels 14 and 16 tensioning wheels 1400 and tensioning wheels 1600 engage with upper surfaces 1162 of the sled portions 1160.

Tensioning wheels 1200 are configured to be coupled with wheeled vehicle 10 so as to project from a rear portion thereof and tensioning wheels 1800 are configured to be coupled with wheeled vehicle 10 so as to project from a front portion thereof. With links 1100 installed or applied to wheels 14 and 16 tensioning wheels 1200 and tensioning wheels 1800 engage with pads 1125 of base portions 1120. In an example, tensioning wheels 1200, 1400, 1600 and 1800 may be coupled with base 11 of vehicle 10 below chair 12.

One wheel of each pair of tensioning wheels lies within a plane common to one wheel of each other pair so that all tensioning wheels on one side of the wheeled vehicle are capable of engaging an endless track of track links simultaneously.

Adapter system 1000 and components thereof may be constructed to any of a variety of dimensions. For example, the limited or governed distance between the medial 1126 and lateral 1166 guides may be approximately 83 millimeters (mm) and the medial 1126 and lateral 1166 guides may be approximately 51 mm high. The upper surface 1122 of the link base portions 1120 may be recessed approximately 3 mm and the distance between the link sled portion upper surfaces 1162 and the link sled portion lower surfaces 1164 may be approximately 3 mm such that the distance between the link sled portion upper surfaces 1162 and the link sled portion lower surfaces 1164 is approximately equal to the recessed depth of the upper surface 1122 of the link base portions 1120. Barrels 1129 may have a length of approximately 32 mm and a width of about 8 mm.

Adapter system 1000 is comprised of or constructed from one or more durable, lightweight materials including but not limited to aluminum, rubber, hard plastic or a combination of these.

According to one example method for converting a wheeled vehicle to a tracked vehicle, each of a plurality of link base portions 1120 are provided with an upper surface 1122, front edges 1128, rear edges 1130 and a medial wheel guide 1126 and each of a plurality of link sled portions 1160 are provided with an upper surface 1162, front and rear edges, a lateral wheel guide 1166 and a lower surface 1164. Lower surfaces 1164 of the plurality of link sled portions 1160 are slidably engaged with or positioned onto the upper surfaces 1122 of the plurality of link base portions 1120 such that relative sliding motion between the plurality of link base portions 1120 and the plurality of link sled portions 1160 is constrained with a ridge 1163 and a slot 1123.

At least some of the plurality of link base portions 1120 are then interconnected by hinges. With a plurality of link base portions 1120 interconnected through hinges, one or more wheels of the wheeled vehicle are applied to or brought into contact with upper surfaces 1162 of the link sled portions 1160 between the medial and lateral wheel guides 1126 and 1166. When the vehicle is a wheelchair, one or more wheels of the wheelchair are applied to the upper surfaces 1162.

With the wheels properly contacting the track links 1100 between the medial 1126 and lateral 1166 guides, all of the plurality of link base portions 1120 are interconnected to form an endless track partially encompassing the one or more wheels 16 and 18.

The above procedure may be repeated for a second plurality of link base portions to form a second endless track of link base portions. Furthermore, endless tracks may be removed from the wheeled vehicle by reversing steps of the above procedure.

According to another method for converting a wheeled vehicle to a tracked vehicle, a first plurality of link base portions 1120 are provided with upper surfaces 1122, front edges 1128, rear edges 1130 and medial wheel guides 1126 and a first plurality of link sled portions 1160 are provided with upper surfaces 1162, front and rear edges, lateral wheel guides 1166 and lower surfaces 1164. Lower surfaces 1164 of the first plurality of link sled portions 1160 are slidably engaged with the upper surface 1122 of the first plurality of link base portions 1120. Again, sliding motion between the plurality of link base portions 1120 and the plurality of link sled portions 1160 is constrained with ridge 1163 and slot 1123.

Figure 3:
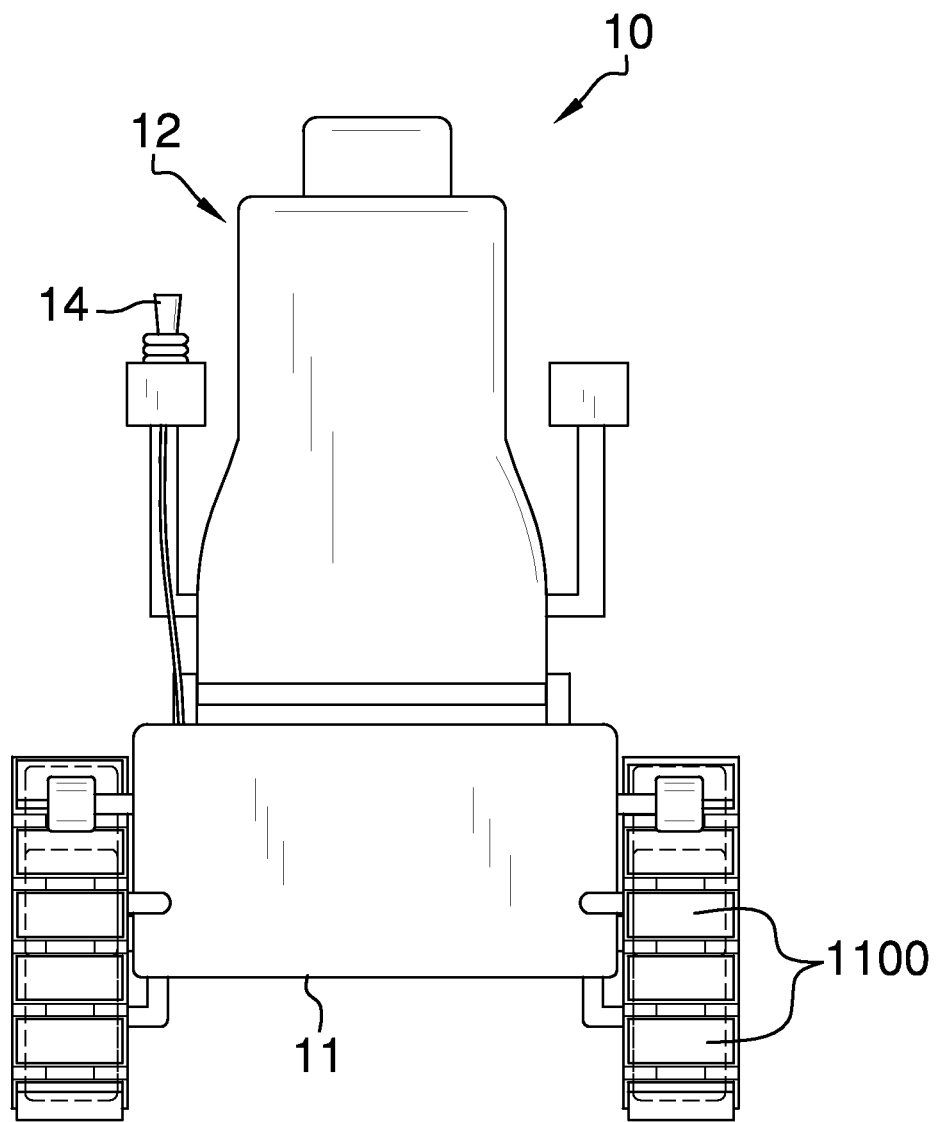
FIG. 3 illustrates a back view of the example adapter system of FIGS. 1 & 2.
Figure 4:
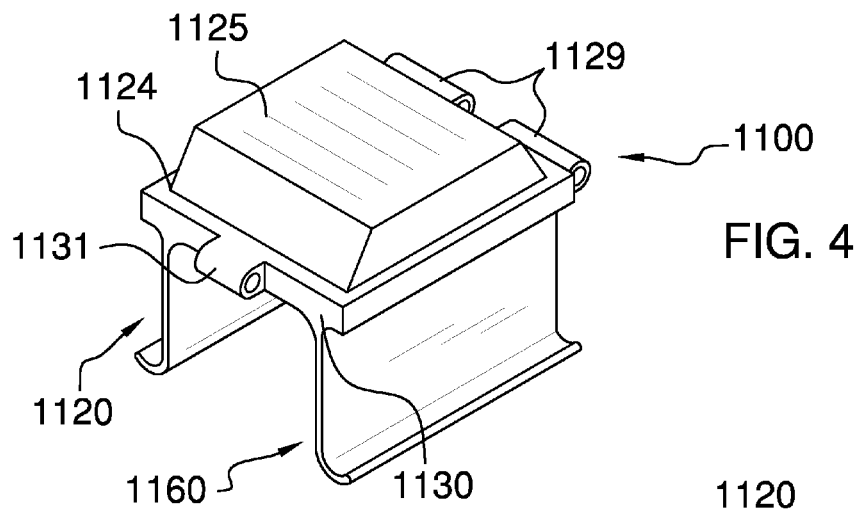
FIG. 4 illustrates a top isometric view of an example track link usable with the adapter system of FIGS. 1-3.
Figure 5:
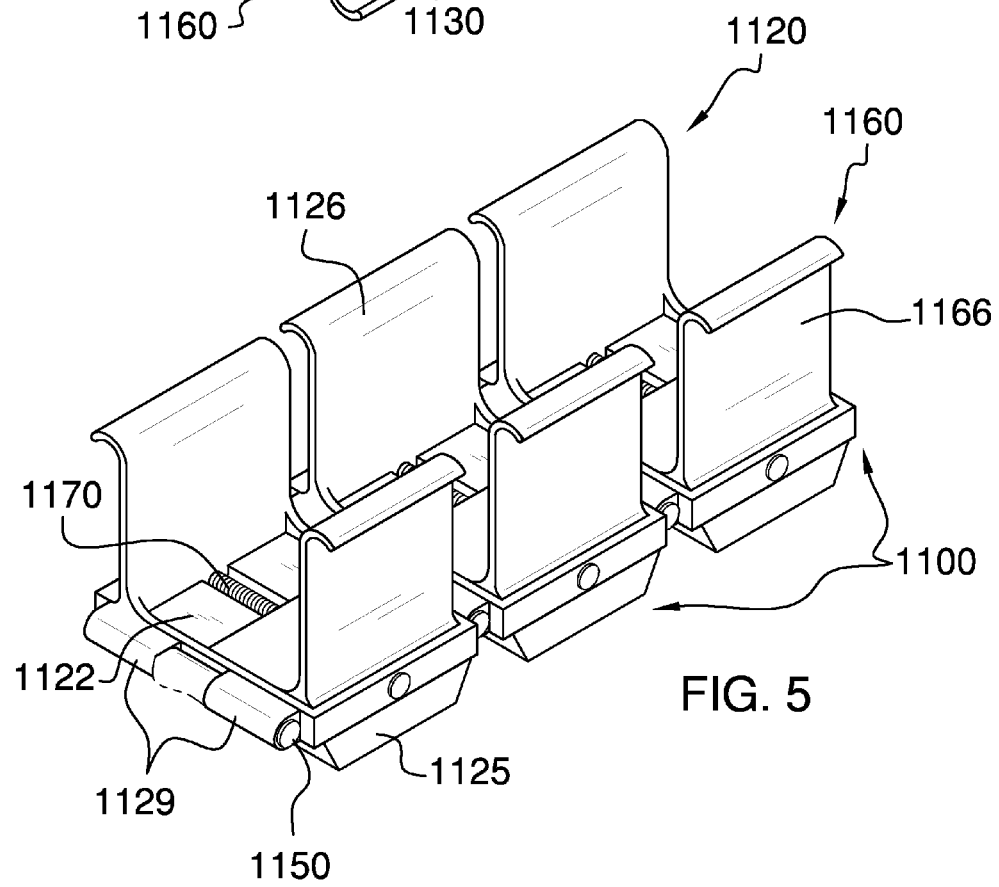
FIG. 5 illustrates a bottom isometric view of a plurality of the example track links of FIG. 4 interconnected by hinges.

The first plurality of link base portions 1120 are interconnected using hinges 1129, 1131 and 1150 to form a first endless track of link base portions 1120 around one or more wheels of the wheeled vehicle. As an example, the endless track of links 1100 illustrated to the right of FIG. 3 may be provided in this manner. With the track links 1100 installed, they may be driven by wheels of the wheeled vehicle.

A second plurality of link base portions are next provided with upper surfaces, front and rear edges and medial wheel guides while a second plurality of link sled portions are provided with upper surfaces, front and rear edges, lateral wheel guides and lower surfaces.

The second plurality of link base portions are interconnected with the hinges to form a second endless track of link base portions configured to be driven by wheels of the wheeled vehicle. As an example, the endless track of links 1100 illustrated to the left of FIG. 3 may be provided in this manner.

Moving medial wheel guides 1126 relative to lateral wheel guides 1166 accommodates the appropriate widths of the wheels of the wheeled vehicle.

To increase tension in the endless track, wheels 1200 and 1800 are depressed against contacting pads 1125 of the plurality of link base portions 1120 and wheels 1400 and 1600 are depressed against upper surfaces 1162 of the plurality of link sled portions 1160. With tensioning wheels 1200, 1400, 1600 and 1800 engaged with the track links 1100, driving a power wheel of the wheeled vehicle 10 will propel the wheeled vehicle in the desired direction in accordance with commands sent through the joystick 14.

Endless tracks may be removed from the wheeled vehicle by reversing steps of the above procedure.

While the above descriptions have been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. An adapter configured to convert a wheeled vehicle to an endless track vehicle, comprising:
    a plurality of adjustable, selectively interconnectable track links having medial and lateral guides configured to contain wheels of the wheeled vehicle;

a plurality of pins configured to selectively interconnect the track links; and a mechanism for adjusting a distance between the medial and lateral guides;

wherein the mechanism for adjusting the distance comprises a threaded fastener;

wherein the medial and lateral guides are configured to move towards one another when the threaded fastener is rotated in a first direction and move away from one another when the threaded fastener is rotated in a second direction opposite the first direction.

2. The adapter as set forth in claim 1, wherein each of the track links further comprises a base portion including a slot and a sled portion comprising a ridge configured for sliding receipt within the slot.

3. The adapter as set forth in claim 2, wherein the base portions include first barrels at a first edge and second barrels at a second edge which second barrels are configured to fit between two or more of the first barrels.

4. The adapter as set forth in claim 3, wherein the first and second barrels are configured to receive the plurality of pins to hingedly couple two or more of the track links.

5. The adapter as set forth in claim 2, wherein the base portions include an upper surface and the sled portions include a lower surface configured for sliding engagement with the upper surface.

6. The adapter as set forth in claim 2, wherein the ridge further comprises a bore orientated generally between the medial and lateral guides and configured to receive the mechanism for adjusting a distance.

7. The adapter as set forth in claim 2, further comprising one or more tensioning wheels configured for coupling with the wheeled vehicle to engage with the sled portions.

8. The adapter as set forth in claim 2, further comprising a pad coupled to each of the base portions.

9. The adapter as set forth in claim 8, further comprising one or more tensioning wheels configured for coupling with the wheeled vehicle and engagement with the pads of the base portions.

10. An endless track adapter system for a wheeled vehicle, comprising:

a plurality of link base portions each having an upper surface, front and rear edges and a medial wheel guide;

a plurality of link sled portions each having an upper surface, front and rear edges, a lateral wheel guide and a lower surface adapted to slidably engage upper surfaces of the link base portions; and wherein sliding engagement of link sled portions with link base portions is constrained by a ridge and a slot.

11. The endless track adapter system as set forth in claim 10, wherein sliding of one of the plurality of link sled portions relative to one of the plurality of link base portions in a first direction causes spacing between the medial wheel guides and the lateral wheel guides to increase and sliding movement of one of the plurality of link sled portions relative to one of the plurality of link base portions in a second, opposite direction causes spacing between the medial wheel guides and the lateral wheel guides to decrease.

12. The endless track adapter system as set forth in claim 10, wherein a plurality of threaded fasteners adjustably couple the plurality of link sled portions to the plurality of link base portions.

13. The endless track adapter system as set forth in claim 10, wherein the upper surfaces of the link base portions are provided in a recessed arrangement such that sliding of the link sled portions upon the link base portions is limited.

14. A method for converting a wheeled vehicle to a tracked vehicle, comprising:

providing a first plurality of link base portions each having an upper surface, front and rear edges and a medial wheel guide;

providing a first plurality of link sled portions each having an upper surface, front and rear edges, a lateral wheel guide and a lower surface;

slidably engaging the lower surface of the first plurality of link sled portions with the upper surface of the first plurality of link base portions; and interconnecting the first plurality of link base portions with hinges to form an endless track of link base portions configured to be driven by wheels of the wheeled vehicle.

15. The method as set forth in claim 14, wherein slidably engaging further comprises constraining relative sliding motion between the plurality of link base portions and the plurality of link sled portions with a ridge and a slot.

16. The method as set forth in claim 14, further comprising depressing a wheel against the endless track of link base portions to increase tension in the endless track.

17. The method as set forth in claim 14, wherein interconnecting the first plurality of link base portions further comprises interconnecting the link base portions around one or more wheels of the wheeled vehicle.

18. The method as set forth in claim 14, further comprising moving the medial wheel guides relative to the lateral wheel guides to accommodate a width of the wheels of the wheeled vehicle.

* * * * *